United States Patent
Wolter

(10) Patent No.: US 8,403,234 B2
(45) Date of Patent: Mar. 26, 2013

(54) HYDRONIC SPACE AND WATER HEATER

(76) Inventor: Gerry Wolter, Cincinnati, OH (US)

(*) Notice: Subject to any disclaimer, the term of this patent is extended or adjusted under 35 U.S.C. 154(b) by 144 days.

(21) Appl. No.: 13/083,870

(22) Filed: Apr. 11, 2011

(65) Prior Publication Data

US 2011/0220210 A1 Sep. 15, 2011

Related U.S. Application Data

(62) Division of application No. 11/978,009, filed on Oct. 26, 2007, now Pat. No. 7,934,664.

(60) Provisional application No. 60/854,522, filed on Oct. 26, 2006.

(51) Int. Cl.
*B60H 1/02* (2006.01)
*B60H 1/04* (2006.01)
*B60H 1/22* (2006.01)

(52) U.S. Cl. ....... 237/12.3 B; 237/2 A; 237/5; 237/12.1; 237/12.3 C; 237/12.4; 237/28; 237/35; 123/142.5 R; 126/31; 126/34; 126/53; 165/43; 165/47; 165/51; 239/129; 239/130

(58) Field of Classification Search ................. 237/8 A, 237/2 A, 2 R, 5, 8 D, 12.3 B, 12.1, 12.3 C, 237/12.4, 28, 32, 34–36, 61; 123/142.5 R; 126/31, 34, 53, 54, 56, 350.1, 351.1, 360.1, 126/360.2; 165/43, 47, 51; 239/129, 130; B60H 1/02, 1/04, 1/22

See application file for complete search history.

(56) References Cited

U.S. PATENT DOCUMENTS

| | | | |
|---|---|---|---|
| 232,164 A | 9/1880 | Abbe | |
| 236,849 A * | 1/1881 | Searle | 237/35 |
| 2,102,940 A | 12/1937 | Buchanan | |
| 2,128,263 A * | 8/1938 | Ofeldt | 239/75 |
| 2,175,812 A * | 10/1939 | Meyerhoefer | 237/12.3 C |
| 2,332,149 A * | 10/1943 | Horton | 290/2 |
| 2,815,938 A * | 12/1957 | Impey et al. | 165/57 |
| 3,062,002 A * | 11/1962 | Shaffer | 60/221 |
| 4,385,726 A * | 5/1983 | Bernauer et al. | 237/12.3 C |
| 4,392,455 A | 7/1983 | Jarvis | |
| 4,455,970 A | 6/1984 | Lyman | |
| 4,705,214 A * | 11/1987 | Johnson | 237/12.3 C |
| 5,025,985 A * | 6/1991 | Enander | 237/2 A |
| 5,067,652 A * | 11/1991 | Enander | 237/81 |
| 5,190,025 A * | 3/1993 | Chen | 126/19.5 |
| 5,277,038 A * | 1/1994 | Carr | 62/434 |
| 5,299,329 A * | 4/1994 | Constantini | 4/597 |
| 5,458,294 A | 10/1995 | Zachary et al. | |
| 5,480,093 A | 1/1996 | Tochizawa et al. | |

(Continued)

FOREIGN PATENT DOCUMENTS

EP 298304 A1 * 1/1989
EP 4 455 510 1/1991

(Continued)

*Primary Examiner* — Steven B McAllister
*Assistant Examiner* — Daniel E Namay
(74) *Attorney, Agent, or Firm* — Frost Brown Todd LLC

(57) ABSTRACT

A compact hydronic space and water heating apparatus and system is disclosed for use in a recreational vehicle. A liquid heating medium, stored within a low pressure tank, is recirculated through a gas fired heater thereby maintaining a desired set point temperature. The liquid heating medium is further circulated through the vehicles hydronic space heaters to heat the interior of the vehicle. Further fresh domestic water is passed through a heat transfer coil within the tank whereby hot domestic water may be provided. An auxiliary heating device is attached to the tank whereby hot combustion engine coolant may assist in maintaining the temperature of the liquid heating medium within the tank and/or reversed to pre heat the combustion engine if and when needed.

2 Claims, 11 Drawing Sheets

U.S. PATENT DOCUMENTS

| | | | |
|---|---|---|---|
| 6,024,291 | A | 2/2000 | Locke |
| 6,232,679 | B1 * | 5/2001 | Norton ............................ 310/11 |
| 6,572,026 | B2 | 6/2003 | Enander et al. |
| 6,659,361 | B2 * | 12/2003 | Sasayama et al. .............. 237/28 |
| 6,732,940 | B2 | 5/2004 | Enander et al. |
| 6,874,694 | B2 * | 4/2005 | Saitoh et al. .................. 237/2 B |
| 7,007,857 | B2 | 3/2006 | Enander et al. |
| 7,234,646 | B2 * | 6/2007 | Saitoh et al. .................. 237/2 B |
| 7,284,710 | B2 * | 10/2007 | Rixen et al. .............. 237/12.3 B |
| 7,654,312 | B2 * | 2/2010 | Baeuerle et al. .............. 165/202 |
| 2002/0060065 | A1 * | 5/2002 | Ferraro ......................... 165/156 |
| 2003/0192954 | A1 * | 10/2003 | Enander et al. .......... 237/12.3 B |
| 2004/0031858 | A1 | 2/2004 | Haklander et al. |
| 2004/0232251 | A1 * | 11/2004 | Enander et al. .......... 237/12.3 B |
| 2006/0196955 | A1 | 9/2006 | Moxon et al. |
| 2007/0158048 | A1 * | 7/2007 | Ferraro ........................... 165/47 |
| 2009/0078784 | A1 | 3/2009 | Fiumidinisi |

FOREIGN PATENT DOCUMENTS

| | | |
|---|---|---|
| JP | 05 096934 | 4/1993 |
| JP | 06 278450 | 10/1994 |

* cited by examiner

HYDRONIC SPACE AND WATER HEATER

RELATED PATENT APPLICATIONS

This applications claims priority of U.S. Provisional Patent Application titled "Hydronic Space & Water Heater" Ser. No. 60/854,522 filed on Oct. 26, 2006, the disclosure of which is incorporated by reference in its entirety. Additionally, this application is a divisional application of U.S. Non-provisional Patent Application titled "Hydronic Space & Water Heater," Ser. No. 11/978,009, filed on Oct. 26, 2007 now U.S. Pat. No. 7,934,664, the disclosure of which is incorporated by reference in its entirety.

BACKGROUND OF THE INVENTION

The present invention generally relates to a gas fired hydronic water and space heating system for use in typical recreational vehicles such as a motor home, boat and the like.

Heretofore, recreational vehicles, such as campers and travel trailers, have traditionally employed gas fired, forced hot air furnaces for space heating along with a gas fired, tank type, water heater to supply domestic hot water. However, motor homes, having a combustion engine available for generating heat, have typically tapped the hot engine cooling medium for such heating.

BRIEF SUMMARY OF THE INVENTION

The present invention provides an improved system for providing space heating and domestic water heating for recreational vehicle use particularly of the travel trailer type. By the present invention a single, compact, rectangular storage tank is provided having therein a temperature controlled fluidic heating medium, such as a suitable antifreeze mixture. The heating medium generally non-toxic, antifreeze, within the tank, is maintained at a temperature of approximately 190F by recirculation, as needed, through a modulating gas fired, heat exchanger positioned adjacent the storage tank. After passing through the storage tank, preferably from top to bottom, the fluidic heating medium is passed through remote hydronic space heaters through out the recreational vehicle and returned to the tank and then to the gas fired heat exchanger.

Within the storage tank is a series of fined tube heat exchanging elements through which the domestic hot water supply is passed, preferably from bottom to top. When the system is in thermodynamic equilibrium the domestic hot water, when drawn, will have an exit temperature of approximately 190F. However, the exiting hot water may be passed through a tempering valve that can be set to any temperature between 100F to 145F. An auxiliary "hot-tap" faucet may be provided, up stream from the tempering valve, to provide hot water without tempering if desired for miscellaneous domestic uses.

DETAILED DESCRIPTION OF THE INVENTION

Figure 1:
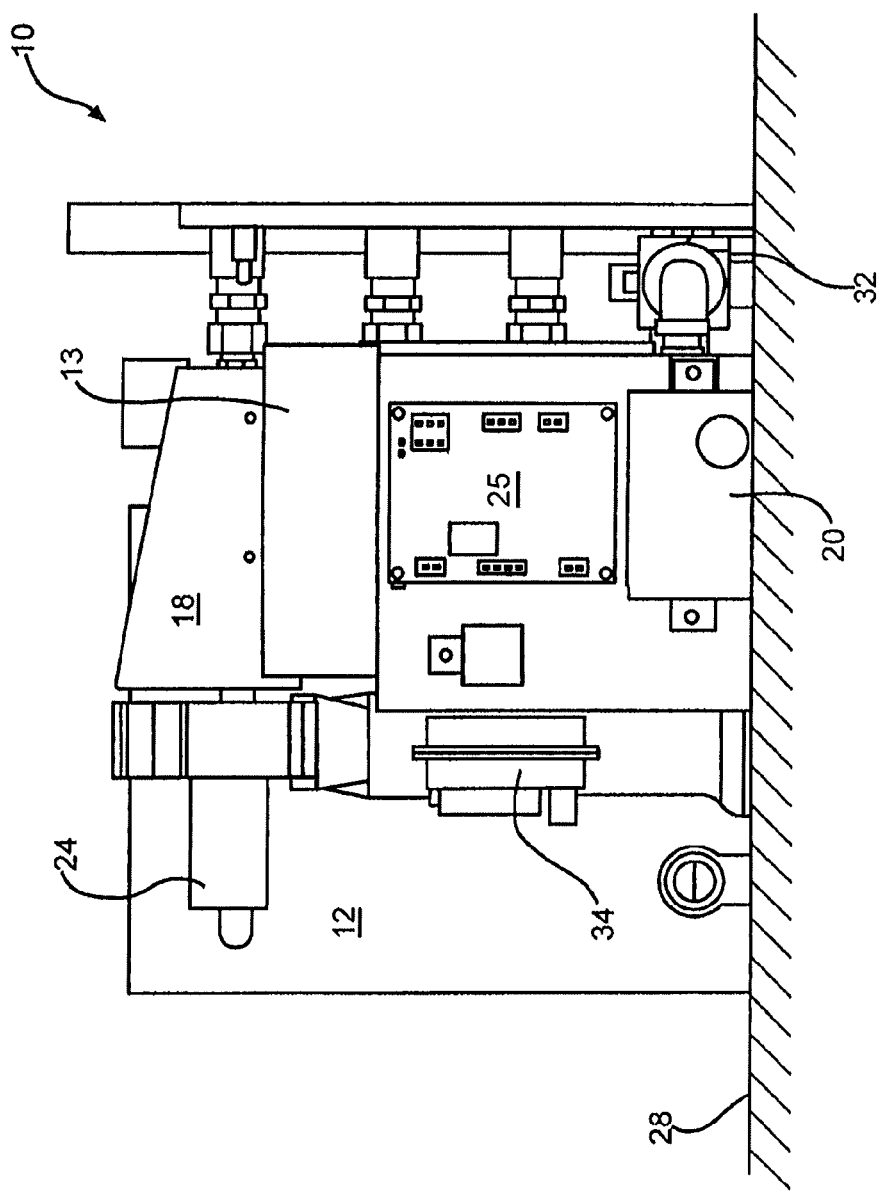
FIG. 1 presents a front elevational, schematic view of the general arrangement of components embodying the present invention.
Figure 2:
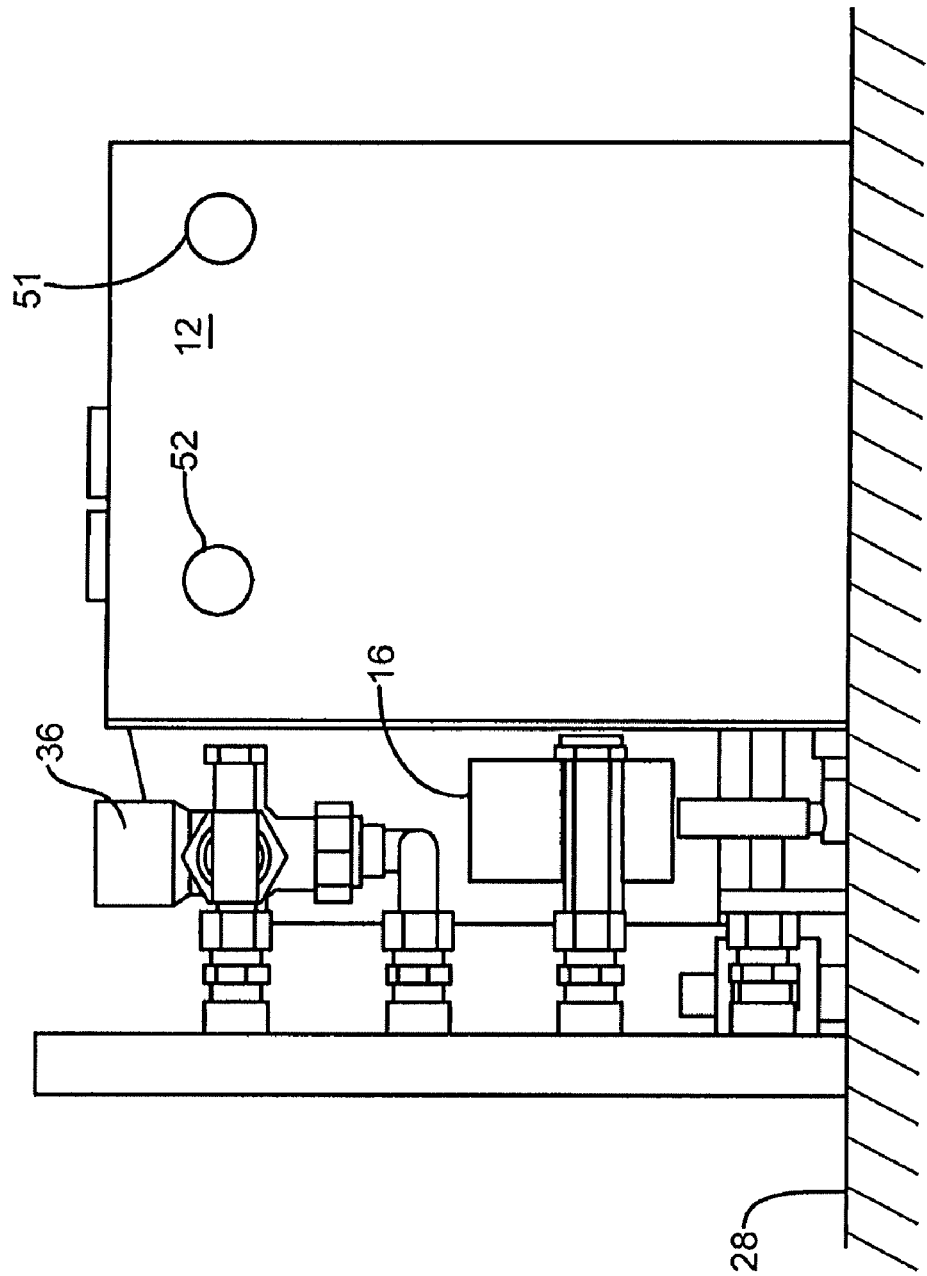
FIG. 2 presents a back elevational, schematic view of the general arrangement of components embodying the present invention.
Figure 3:
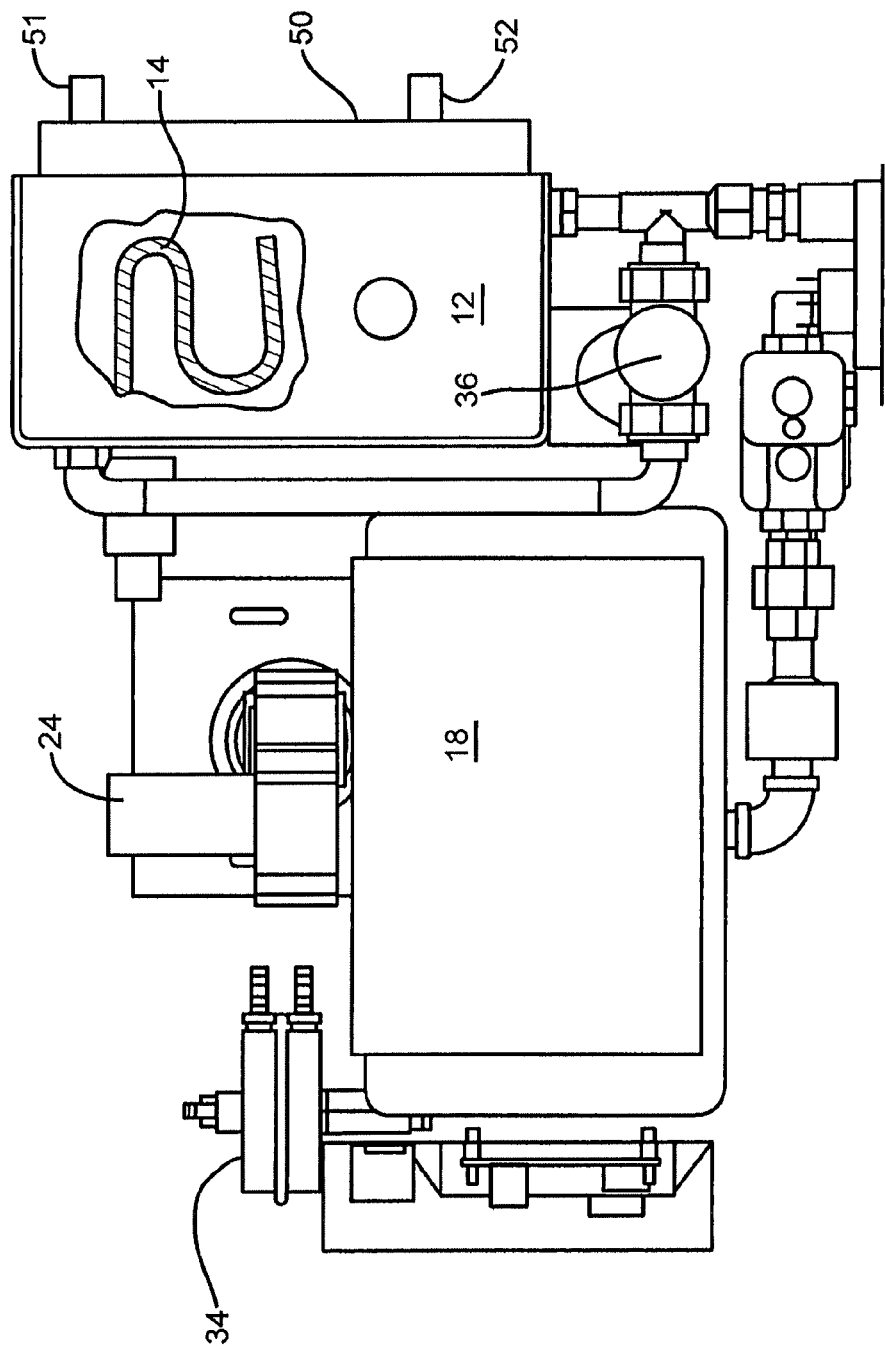
FIG. 3 presents a top, schematic view of the general arrangement of components embodying the present invention.
Figure 4:
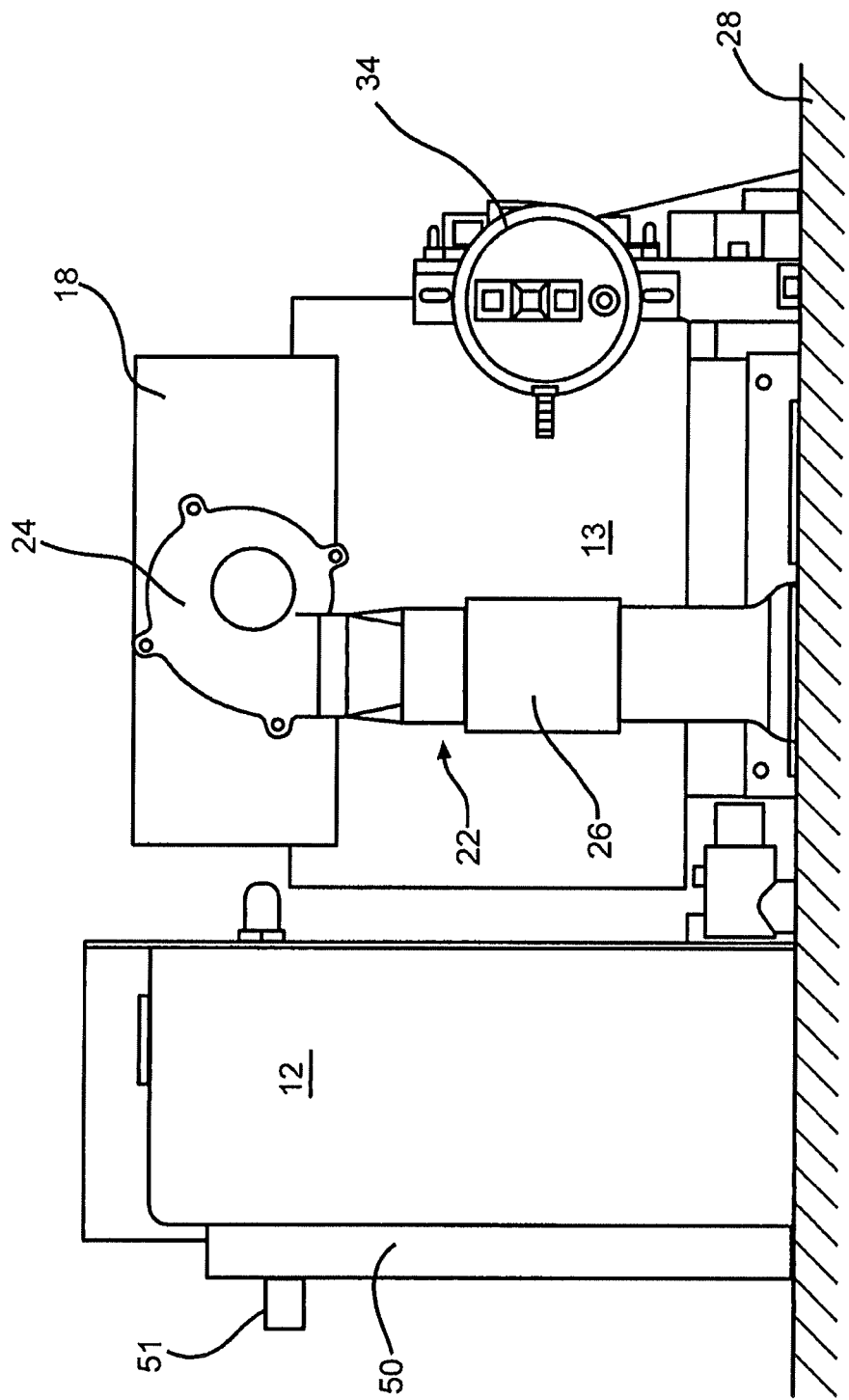
FIG. 4 presents a left side elevational, schematic view of the general arrangement of components embodying the present invention.
Figure 5:
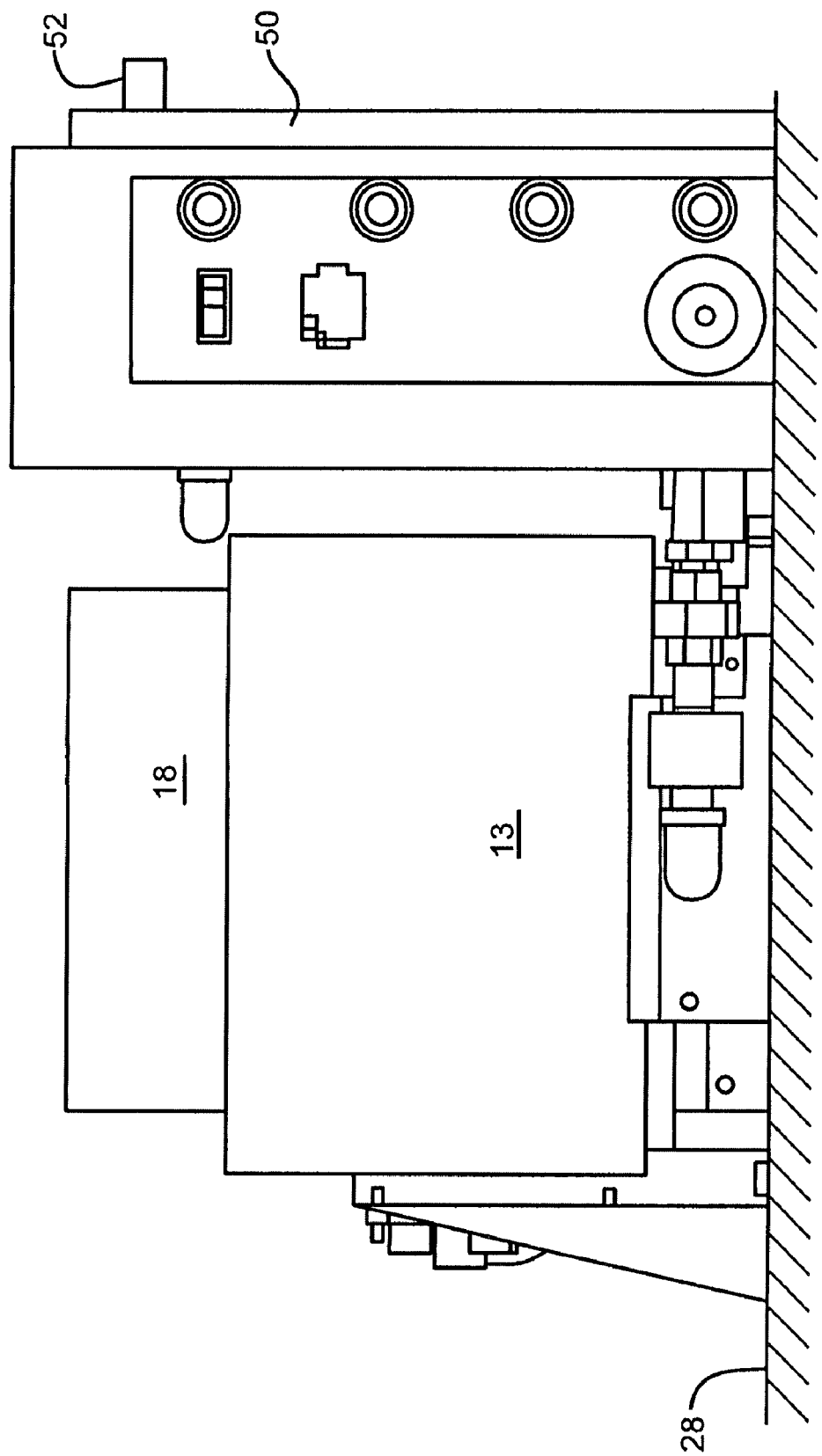
FIG. 5 presents a right side elevational, schematic view of the general arrangement of components embodying the present invention.
Figure 6:
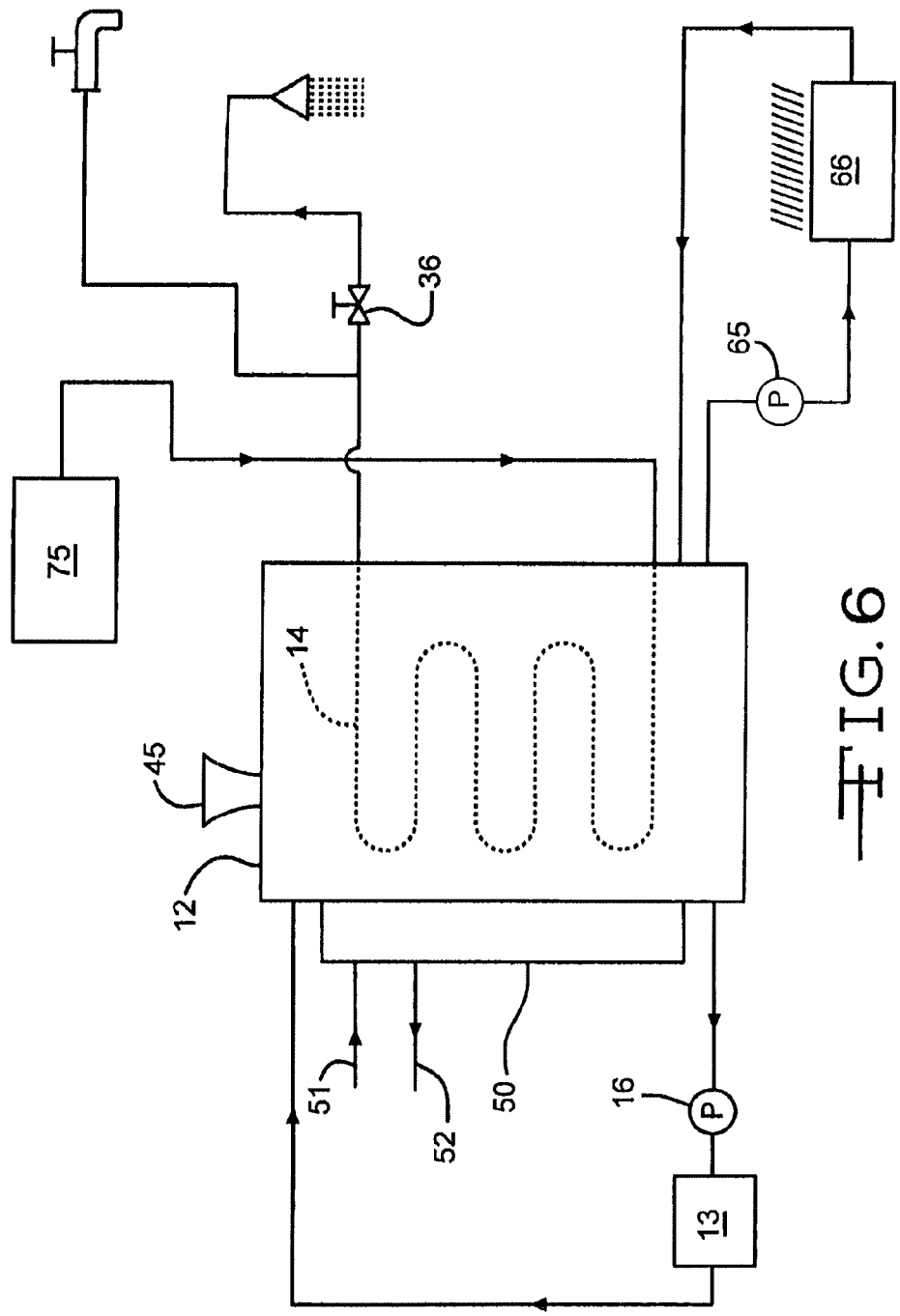
FIG. 6 presents a schematical representation of the present invention elements and the relationship therebetween.

Functional Components of the Invention:

FIGS. 1 through 3 present a front, back and top view, respectively of the compact arrangement 10 of components embodying the present invention. Left and right side views are presented in FIGS. 4 and 5 respectively. FIG. 6 diagrammatically presents the principle functional elements of the Hydronic Space & Water Heater system and the relationship between the elements.

Figure 3A:
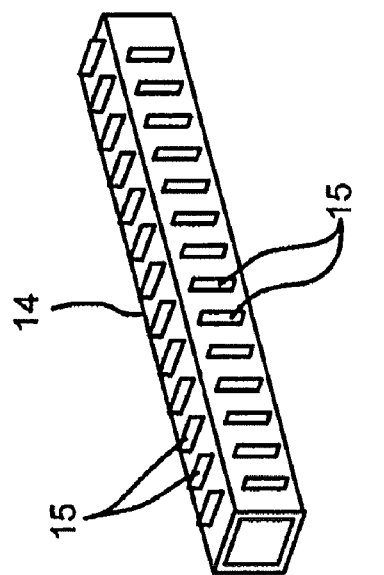
FIG. 3A presents a schematical representation of the rectangular crossection heat exchanger tubing.

Referring now to FIGS. 1 through 6, main tank 12 contains therein a series of finned tube heat exchangers 14, as illustrated in FIGS. 3, and 6. Operationally main tank 12 is filled nearly full with a liquid, heat transferring, antifreeze mixture. Positioned adjacent main tank 12 is gas fired heat exchanger 13 for heating the antifreeze mixture as it is re-circulated through main tank 12, and heat exchanger 13, by re-circulating pump 16, in a closed loop fashion, as will be discussed further below. Preferably the finned tube heat exchanger 14 has a square, or rectangular, crossection, as opposed to a typical circular crossection, as illustrated in FIG. 3A. A square, or rectangular, crossection provides a greater heat transfer surface area per lineal foot of tubing thereby permitting a more even heat migration per lineal foot as compared to a typical circular crossection. Typical heat conducting fins 15 are welded to all four sides of the rectangular heat exchanger tubing 14.

Atop heat exchanger 13 is exhaust flue 18 for collecting the exhaust gasses and products of combustion from the gas-fired heat exchanger 13. A power vent assembly 24 removes the exhaust gasses and products of combustion from exhaust flue 18 by way of power vent assembly 24 thereby causing the exhaust gasses and products of combustion to exit the vehicle by way of vent pipe 26 through the floor 28 of the of the vehicle or else ware if desired.

Gas is supplied to the burner section, not shown, of heat exchanger 13 through gas modulation valve 32. Gas modulation valve 32 controls the temperature of the re-circulating antifreeze mixture by modulating the gas volumetric flow as is described further below.

Further, a flue proofing switch 34 is provided to assure that the exhaust vent pipe 26 is open and clear of possible obstructions and that the power vent is functioning. This switch also senses a lack of make up combustion air in the compartment and will not allow the burner to ignite if there is a lack of combustion air.

Figure 3B:
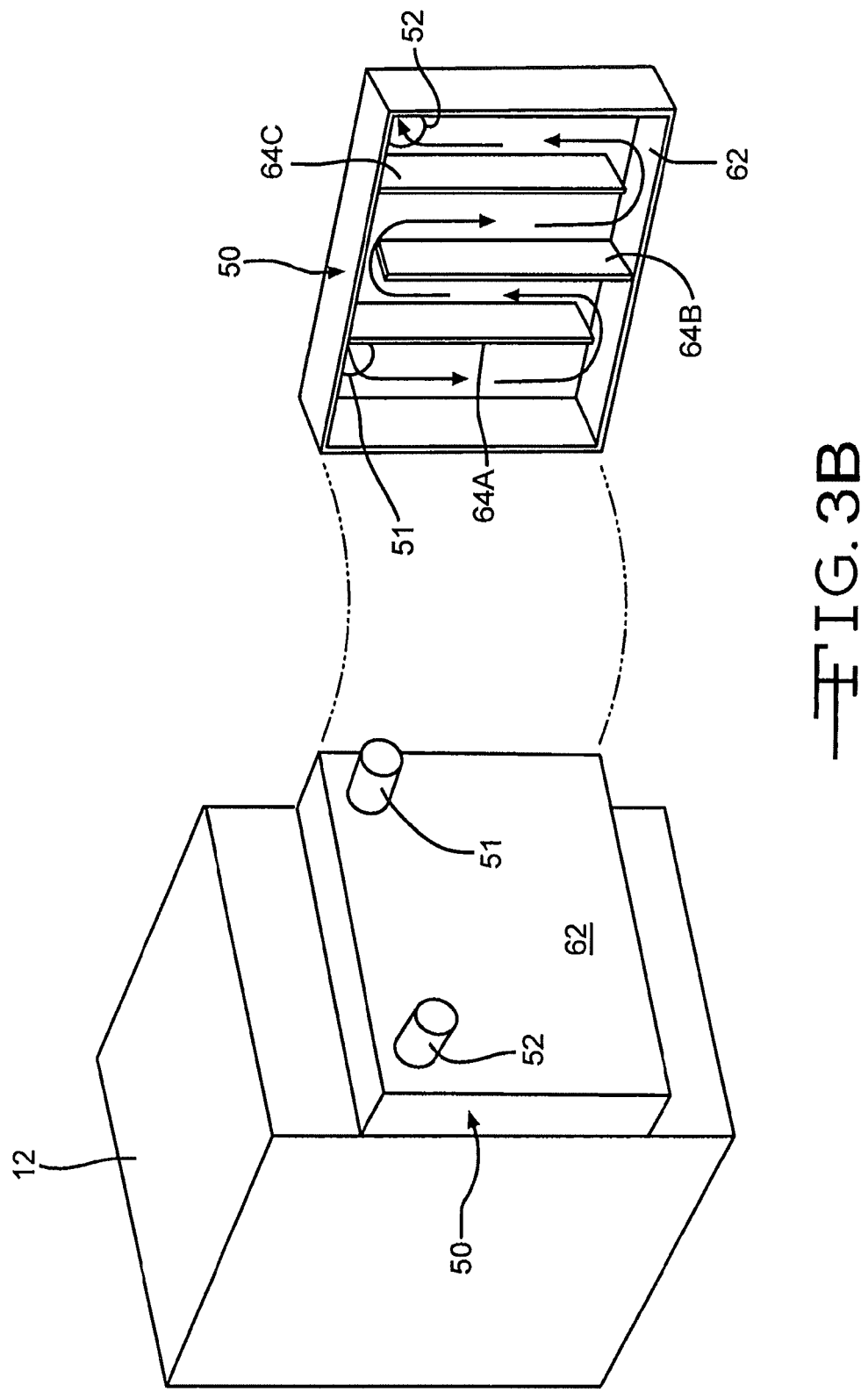
FIG. 3B presents schematic pictorial of an auxiliary combustion heating device attached to the main tank.

Optionally an auxiliary heating assembly 50 may be added to an external wall of tank 12 as diagrammatically illustrated in FIG. 3B. Auxiliary heating assembly 50 may be used to pre-heat an internal combustion engine of a motor home and/or to use excess engine heat to assist heating tank 12 depending upon the direction of flow of the engine coolant.

Auxiliary engine heating assembly 50 comprises a five sided, metal shroud having alternating baffle plates 64A, 64B, and 64C, etc welded therein thereby providing a serpentine flow of engine coolant from intake 51 to exit 52. Shroud 62 is welded about its periphery to the desired wall of tank 12. Engine coolant is passed through heating assembly 50 to either pre-heat the engine or to assist in heating tank 12.

Operation of the invention:

When the power and fuel, typically propane, are initially turned on a tank wall thermostat, not shown, senses the temperature of the fluidic heating medium stored within tank 12 and the temperature of the incoming water in the domestic hot water heat exchanger coils by wall thermostats. If the temperature of the fluidic heating medium is below 190F power is sent to the heater control board 25, re-circulating pump 16, and the burner of heat exchanger 13. Additionally the blowers of the vehicle's remote space heaters are energized to begin providing available heat to the vehicle interior if the interior room wall thermostats are calling for heat.

Figure 8A:
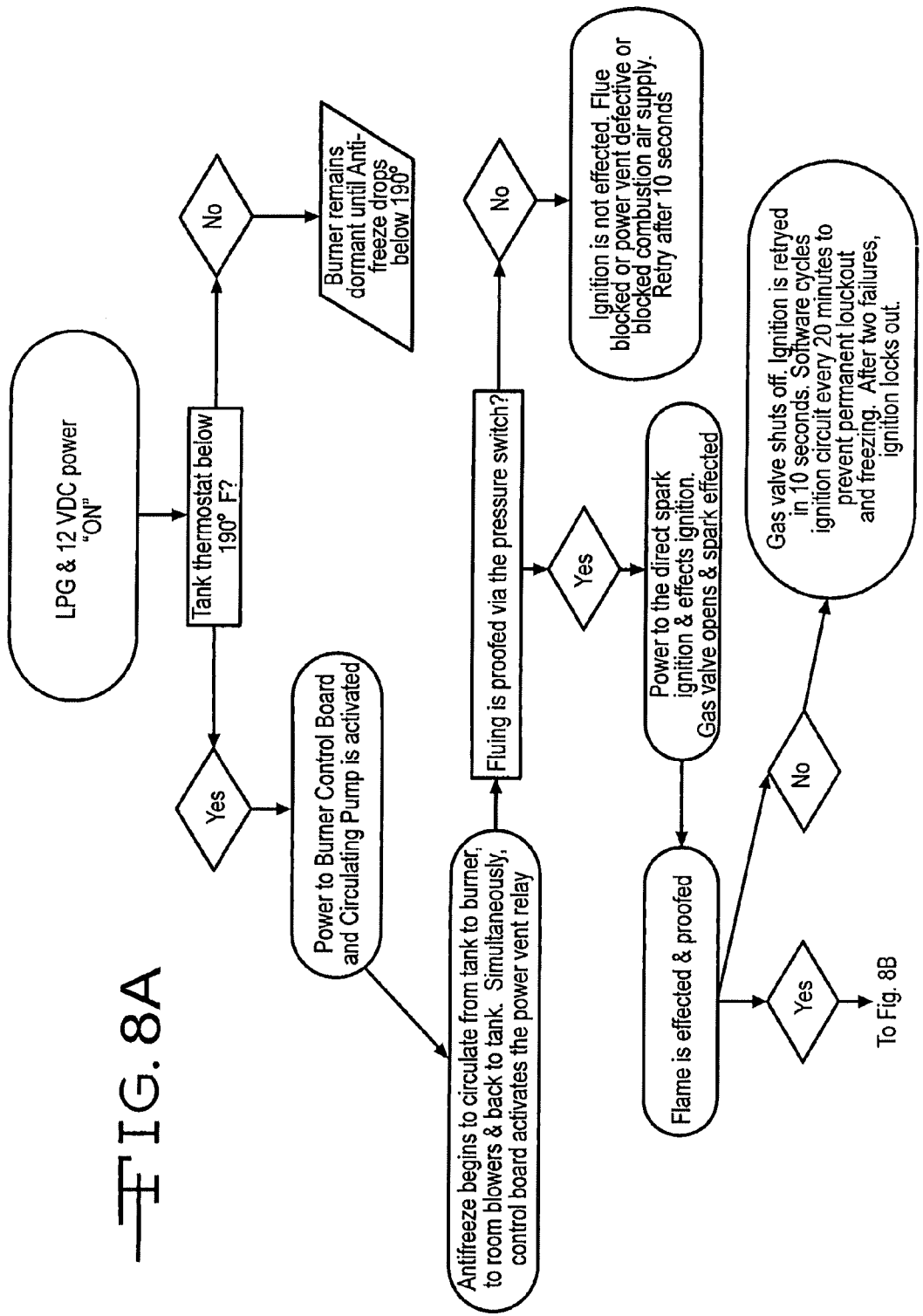
FIGS. 8A, 8B and 8C present a flow diagram of the sequential events as they occur during operation of the present invention.

Simultaneously the heater control board 25 powers a power vent relay which activates the power vent assembly 24 and fluing is proofed by flue proofing switch 34. If vent pipe 26 is sensed to be clear and open, power is sent to the spark ignition board 20. Gas modulation valve 32 is energized and a spark is affected to the igniter element, not shown. The burner flame is then proofed via the same igniter element. If the flue is blocked, the gas burner will not light. See FIG. 8A.

Figure 8B:
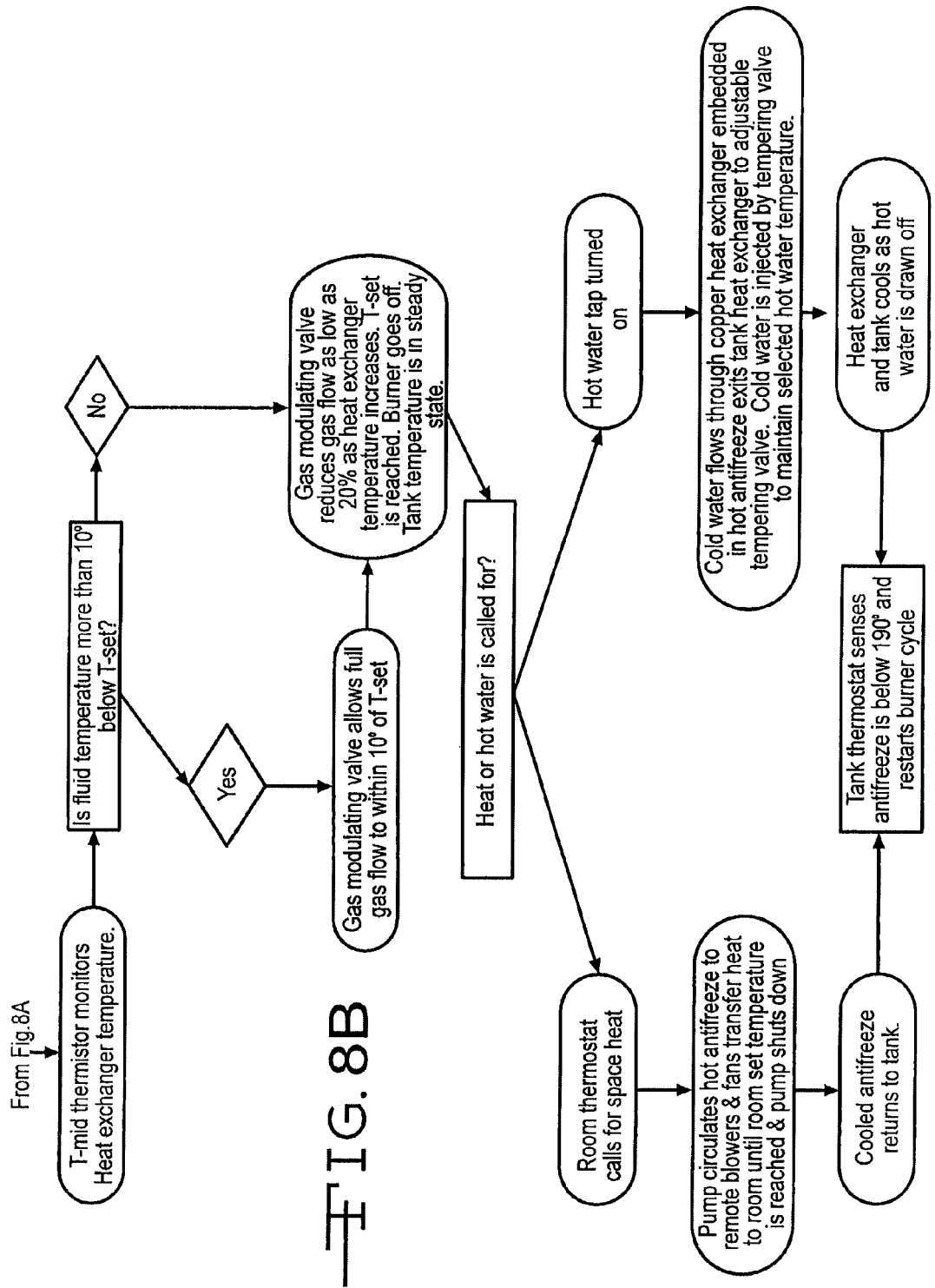

A T-Mid Thermister, not shown senses the temperature of tank 12 twice per second. As the set point temperature, preferably 190F, is approached, the gas flow, to the heat exchanger burner, is reduced as much as 70% by reducing the voltage to the gas modulating valve 32 until the set point temperature is achieved and the burner is shut off By modulating the gas flow to the heat exchanger burner in this manner, flash boiling, burner cycling and rapid pressure spikes within tank 12 are avoided. A preferable gas modulating system is taught and described in U.S. Pat. No. 5,458,294 titled "Control System For Controlling Gas Fuel Flow"and is incorporated herein by reference. See FIG. 8B.

Figure 8C:
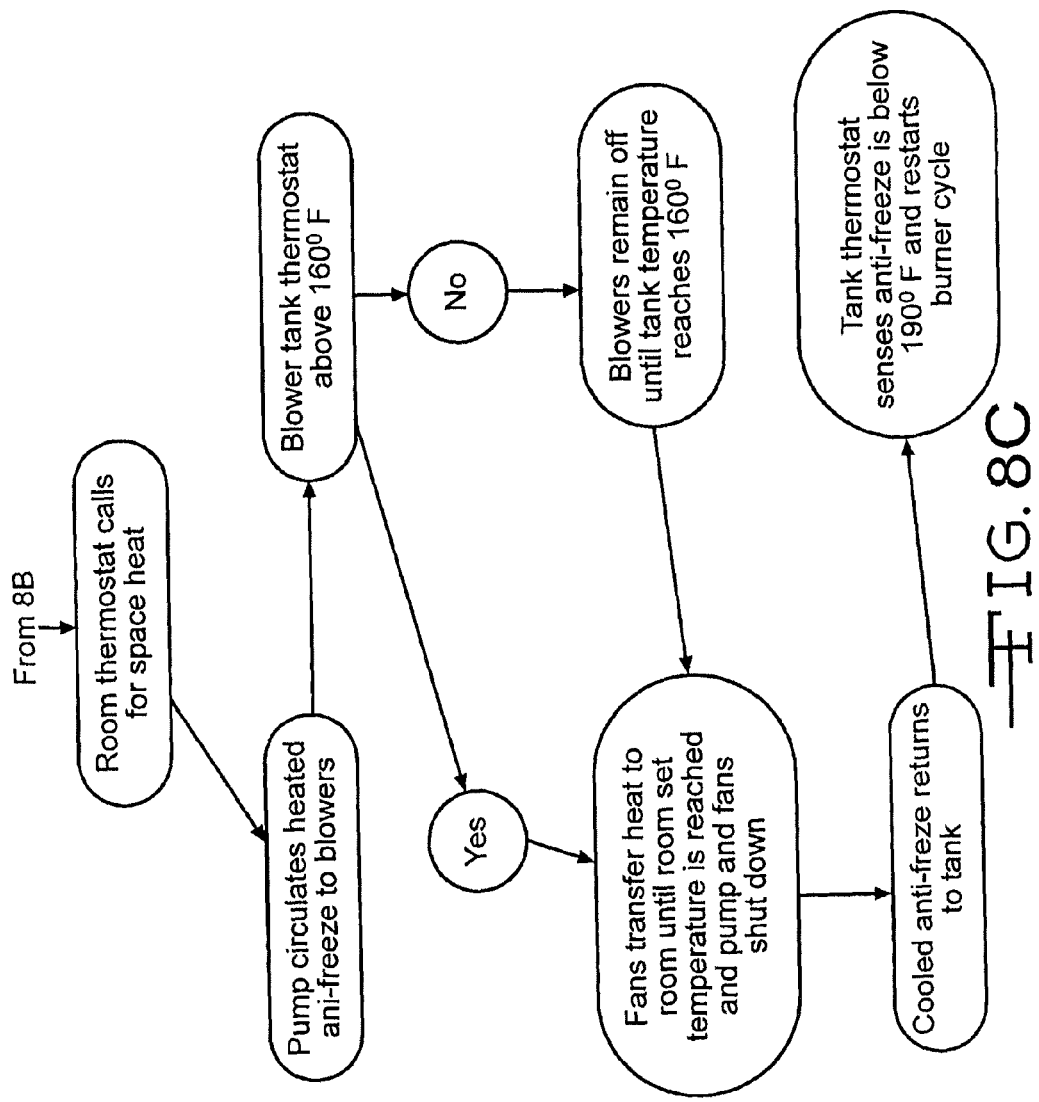

When a hot water tap is opened, cold water is supplied from a water reservoir 75 to finned tube heat exchanger 14, beginning at the bottom of tank 12, and imbedded throughout main tank 12. Hot water then exits heat exchanger 14, at the top of tank 12, through tempering valve 36 that may be preset to any suitable temperature between 100F and 145F. Preferably cold water enters finned tube heat exchanger 14 at the bottom of tank 12 and is discharged through tempering valve 36 positioned at the top of the tank thereby presenting a "counter flow" heat exchanger. See FIG. 8C.

As the fluidic heat transfer medium within tank 12 cools the burner cycle is restarted to maintain a tank temperature of 190F.

When a room thermostat senses a temperature below the room set point temperature, power is sent to zone circulation pump 65, heater control board and the heater blower 66, to provide heat to the room. The burner will be activated, by the burner tank thermostat, as described above, if the fluidic heating medium (antifreeze) temperature falls below a given set point temperature.

In the event the domestic hot water temperature falls below a given set point temperature, the space heater blower 66 is shut down until the hot water temperature rises above the given set point temperature whereby the space heater blower 66 is again started thereby continuing to provide heat to the vehicle interior. Where a multiple zone space heating system is used, all space heaters maybe simultaneously shut down by switching the negative 12-volt leg of the tank 12 temperature sensor to ground thereby disabling all space heaters.

Figure 7:
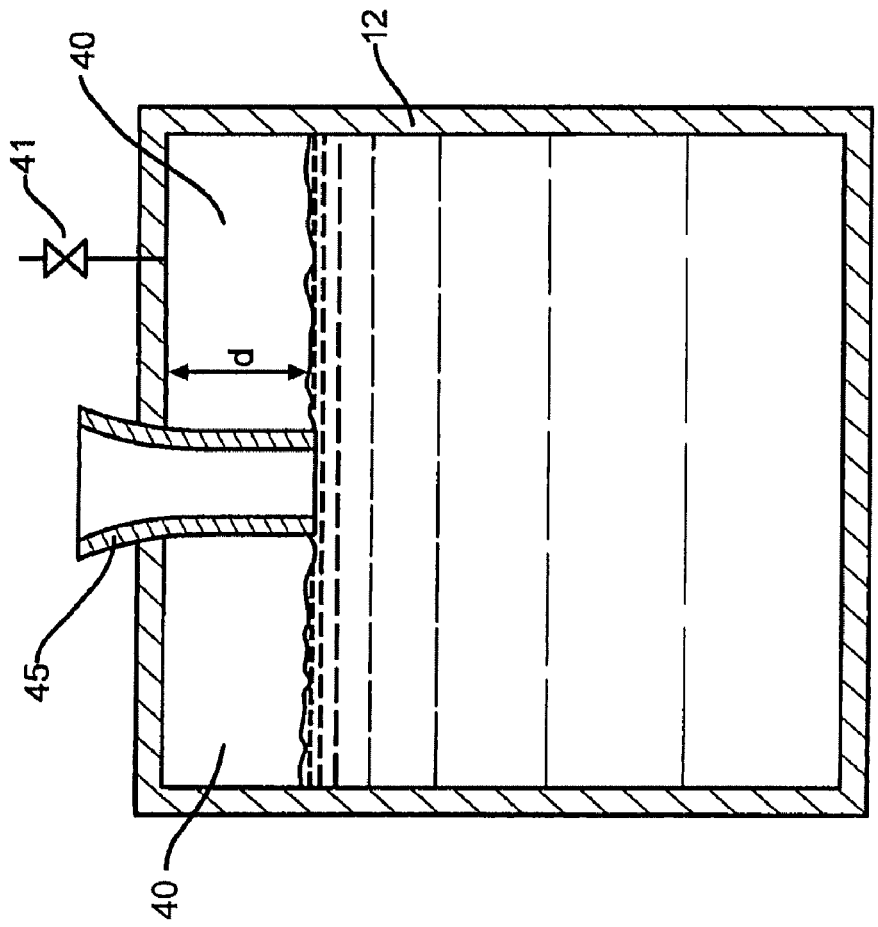
FIG. 7 presents a schematical crossection of the main tank showing a preferred fill tube arrangement.

An open space, or head, 40 is provided atop the fluidic heating medium, as illustrated in FIG. 7, to allow for expansion of the fluidic heating medium within tank 12. Fill tube 45 extends into tank 12 a given distance d. When filled, or when fluid is added, the fluid is brought up to the bottom of fill tube 45 and will go no further thereby assuring that a prescribed level of fluid is not exceeded within tank 12. Alternatively an external "sight-glass" may be provided to tank 12.

Optionally a purge valve 41 may be included to relieve accumulated air and pressure from the head 40 of tank 12 but prevents fluid from exiting the tank thereby maintaining a low operating pressure, below 10 psi without an external expansion tank. Alternatively, a typical expansion tank may be used.

While principles of the present invention are described above in connection with a specific embodiment, it is to be clearly understood that this description is made only by way of example and not as a limitation of the scope of the invention

What is claimed is:

1. A method of providing hot, potable, domestic water in a recreational vehicle comprising:
    a) providing a holding tank having a predetermined volume of a liquid heating medium therein,
    b) providing means for heating said liquid heating medium external to said holding tank,
    c) providing a first pump for circulating said liquid heating medium from said holding tank through said means for heating said liquid heating medium and returning said liquid heating medium to said tank,
    d) providing a source for potable, domestic water,
    e) passing a tubular conduit through said liquid heating medium, within said holding tank, wherein said tubular conduit comprises a rectangular cross section,
    f) passing potable domestic water from said potable domestic water source through said tubular conduit whereby heat is transferred from said liquid heating medium, through said tubular conduit and into said potable domestic water, as it passes through said tubular conduit,
    g) providing at least one hydronic space heater within said recreational vehicle,
    h) providing an auxiliary heating assembly in communication with an external wall of said holding tank,
    i) passing hot combustion engine coolant through said auxiliary heating assembly to assist in heating said liquid heating medium,
    j) providing a second pump for circulation of said liquid heating medium from said holding tank through said hydronic space heater and back to said holding tank whereby said hydronic space heater provides heated air to said recreational vehicle,
    k) providing thermostatic control for sensing the temperature of said potable water passing through said conduit and disabling said second pump when said temperature is below a predetermined set point temperature.

2. In a system for providing hot, potable, domestic water in a recreational vehicle comprising:
    a) a holding tank having a predetermined volume of liquid heating medium therein,
    b) an auxiliary tank in communication with said holding tank, wherein said auxiliary tank is in further communication with an engine of said recreational vehicle, c) a gas fired heater, external to said tank, for heating said liquid heating medium,
d) a first pump for circulating said liquid heating medium from said holding tank through said gas fired heater and returning said liquid heating medium to said tank,
e) a source for potable, domestic water,
f) a tubular conduit through said liquid heating medium, within said holding tank, for conveying, said potable domestic water from said potable domestic, water source, through said tubular conduit whereby heat is transferred from said liquid heating medium, through said tubular conduit and into said potable domestic water, as it passes through said tubular conduit,
g) at least one hydronic space heater within said recreational vehicle,
h) a second pump for circulation of said liquid heating medium from said holding tank through said hydronic space heater and back to said holding tank whereby said hydronic space heater provides heated air to said recreational vehicle,
the method of maintaining said liquid heating medium at a predetermined temperature comprising:

1) sensing the temperature of said liquid heating medium within said holding tank,
2) if said temperature is a given value below said predetermined temperature activating said first pump and activating said gas heater,
3) continue sensing the temperature of said liquid heating medium within said tank and begin modulating the gas flow to said gas heater as said liquid heating medium, as a function of said sensed temperature, as said sensed temperature approaches said predetermined temperature, wherein the act of beginning modulating involves said auxiliary tank transferring at least a portion of heat from the engine to said liquid medium of said holding tank,
4) providing a thermostatic control for sensing the temperature of said potable water passing through said conduit and disabling said second pump when said temperature is below a predetermined set point temperature,
5) deactivating said first pump and said gas heater when said set point temperature is obtained.

\* \* \* \* \*